Figure 1B:
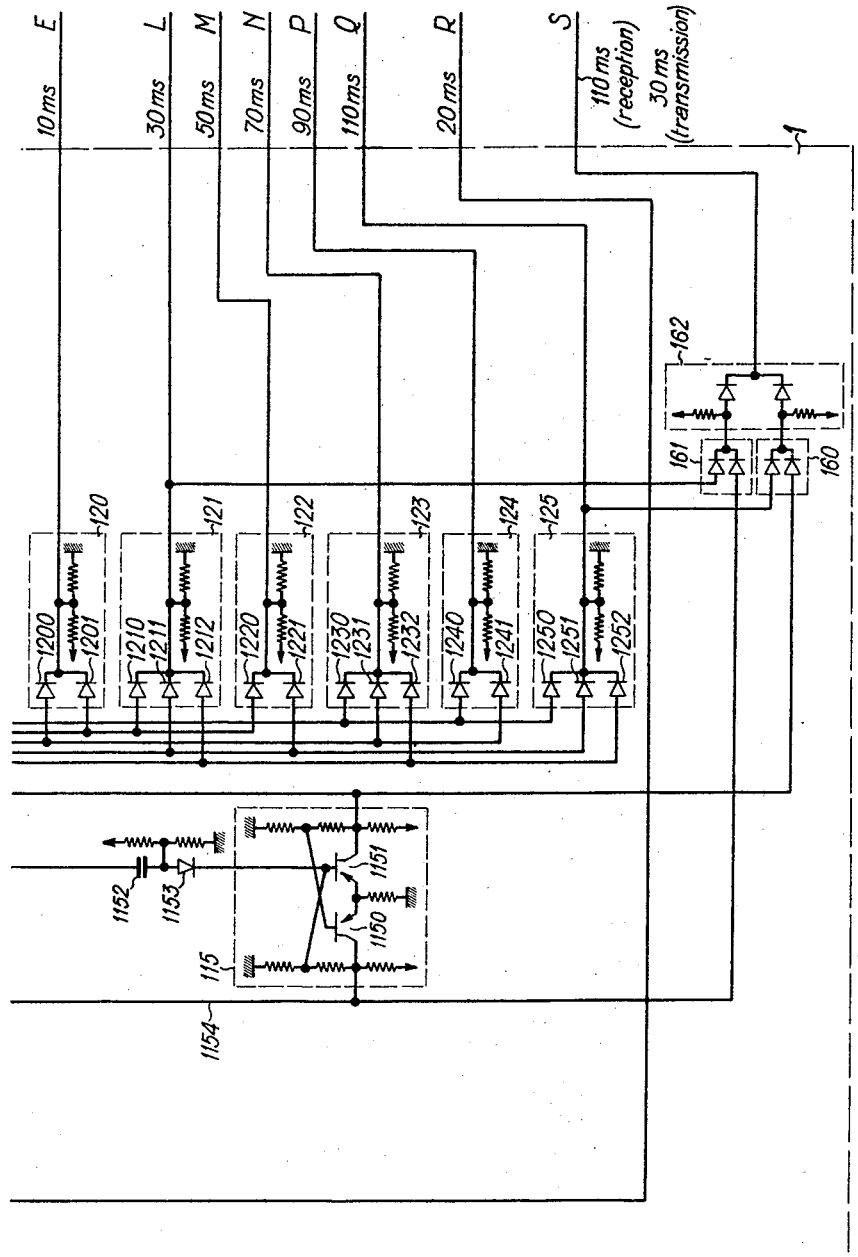

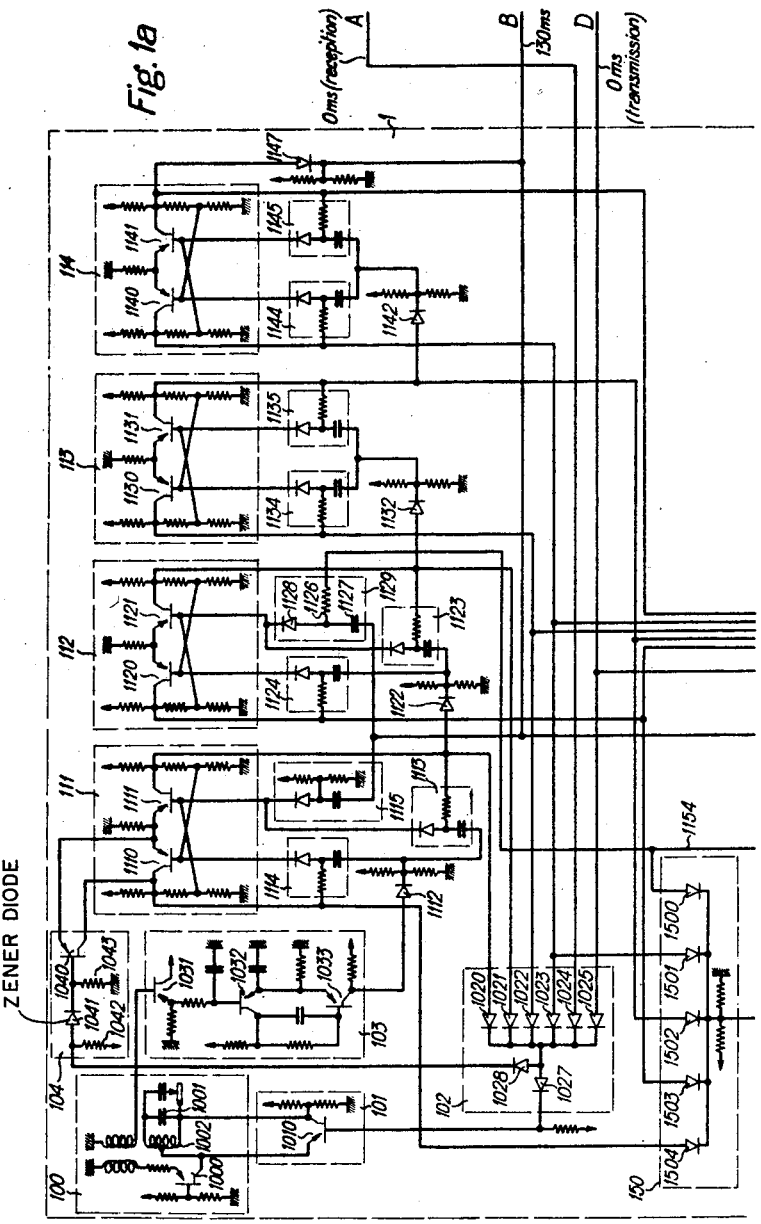

July 30, 1963  R. P. SOURGENS ETAL  3,099,705
ELECTRONIC TELEPRINTER ADAPTED FOR COLLATION
Filed July 31, 1961  8 Sheets-Sheet 5

INVENTORS
ROGER P. SOURGENS & RAYMOND A. CHOLLET
BY
Abraham A. Saffitz
ATTORNEY

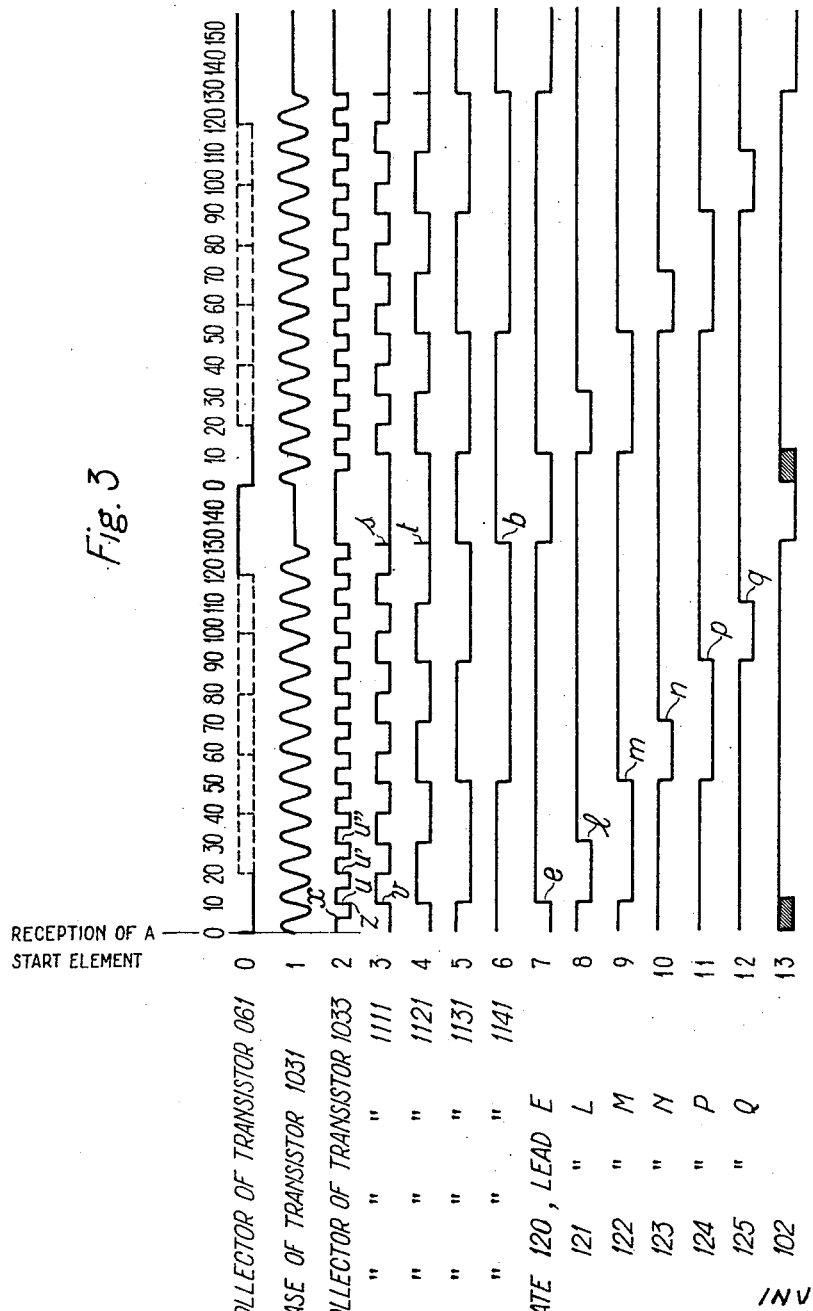

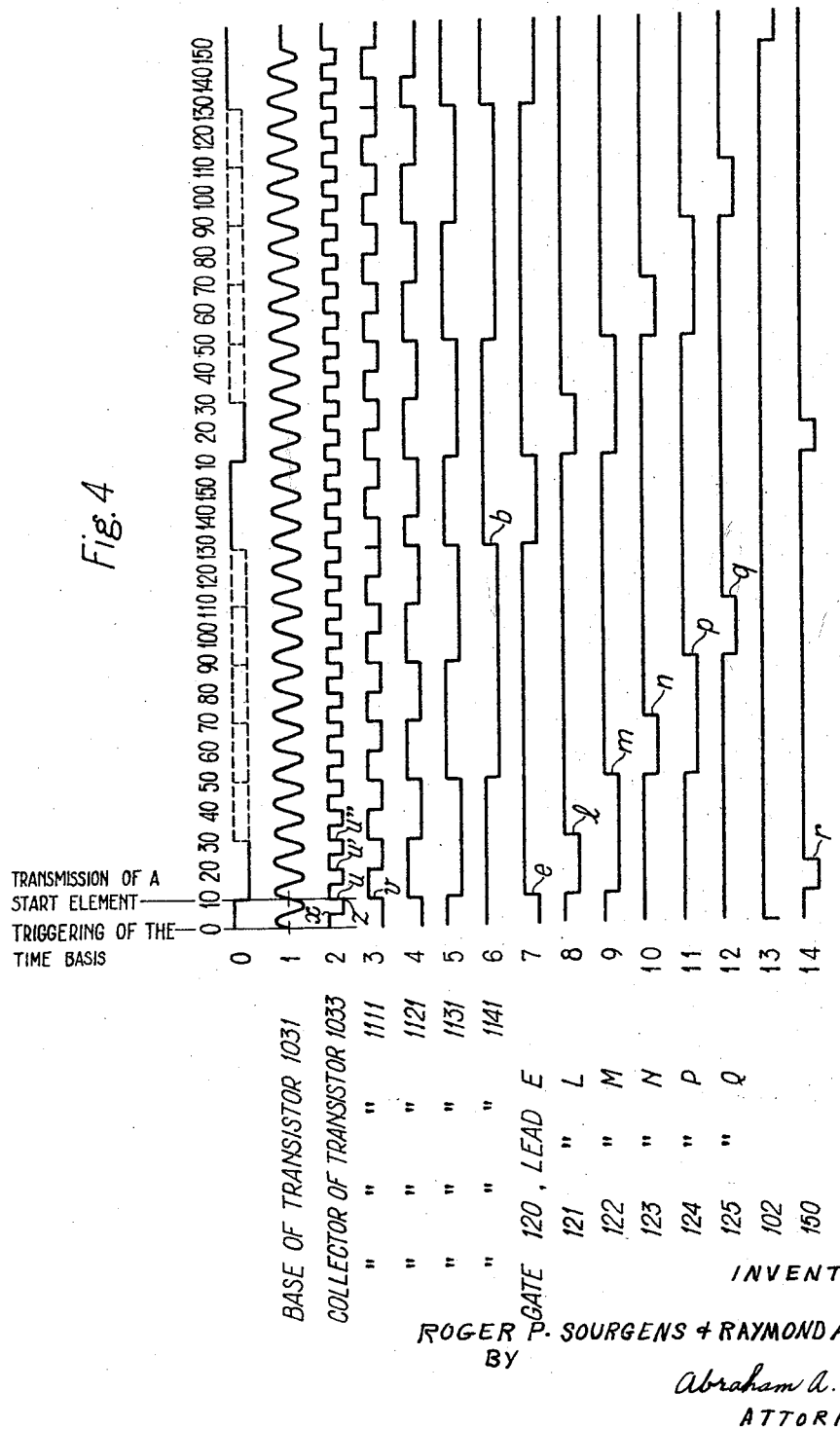

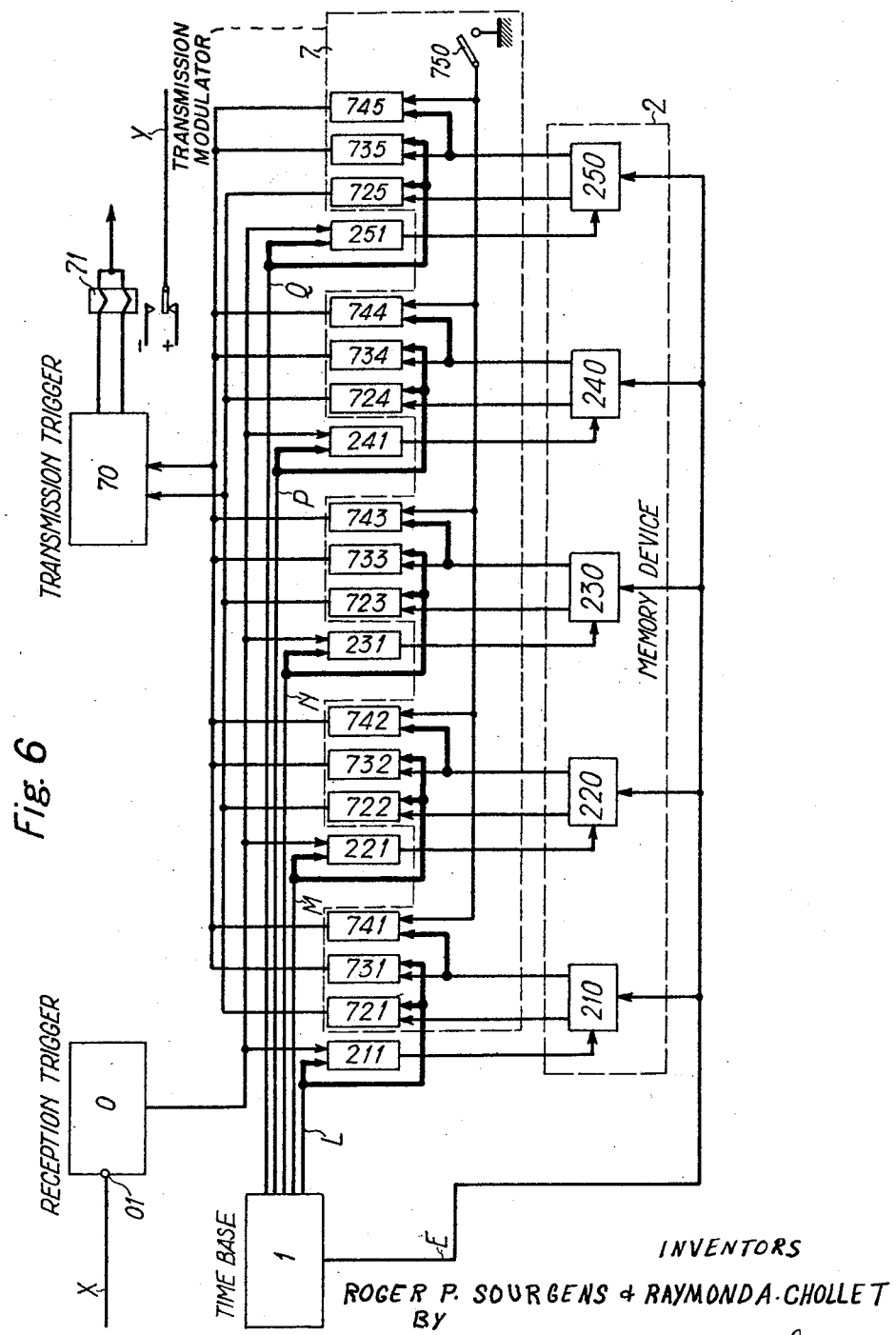

United States Patent Office 3,099,705
Patented July 30, 1963

3,099,705
ELECTRONIC TELEPRINTER ADAPTED FOR COLLATION
Roger P. Sourgens, 4 Avenue du Marechal Joffre, Bourg-la-Reine, France, and Raymond A. Chollet, Basse-Terre, Gaudeloupe, French West Indies
Filed July 31, 1961, Ser. No. 128,115
2 Claims. (Cl. 178—2)

This invention concerns a "collation type" electronic teleprinter, i.e. one which possesses a distortionless re-emission device, on the transmission channel, of the elements which are received on the reception channel, this re-emission taking place with no delay, each element being retransmitted at the very instant of reception.

One is aware, for example from U.S. Patent No. 2,897,258 issued to the present applicants on July 28, 1959, of electronic teleprinters comprising essentially a memory device, a reception trigger, a transmission trigger, a keyboard, a translator-printer, a time-base and gates controlled by same time-base and allowing, during reception, the code elements of a telegraphic character to be transferred serially from the reception trigger to the memory device and parallelly from the memory device to the translater-printer where the telegraphic character is printed and, during transmission, the code elements to be transferred parallelly from the keyboard to the memory device and serially from the memory device to the transmission trigger where the telegraphic character is transmitted.

In said teleprinters, the gates have to be controlled differently according to whether the teleprinter receives or transmits and, consequently, the time-base has to produce two pluralities of decoupled timing pulses, a plurality being used during reception and a plurality during transmission. Such a time-base is rather complicated.

In teleprinters adapted for collation, the gates inserted between the reception trigger and the memory device which allow the received elements to be stored and the gates inserted between the memory device and the transmission trigger, which allow the received elements to be retransmitted or collated as soon as stored, must operate simultaneously and, consequently, must be controlled by timing pulses which are the same irrespectively of whether the teleprinter receives or transmits or receives with or without collating.

The object of the invention is to provide an electronic teleprinter adapted for collation having a time-base producing a single series of timing pulses whatever the actual use of the teleprinter (transmission or reception).

According to the invention, the electronic teleprinter comprises two sets of gates inserted between the memory device and the transmission trigger, the first set operating during transmission for transferring the code elements to be transmitted issued from the keyboard and stored in the memory device into the transmission trigger, and the second set operating during reception with collation for transferring the received code elements to be collated issued from the reception trigger and stored in the memory device into the transmission trigger.

As will be seen in the following, the two sets of gates are composed of a plurality of groups of four gates, and more particularly of two pairs of gates for each trigger of the memory device, said two pairs of gates connecting the two outputs of said trigger to the two inputs of the transmission trigger, both pairs of gates being controlled by the timing pulses and one pair being further controlled by the transmission output of a "transmission-reception" trigger and the other pair by the reception output of said "transmission-reception" trigger and by a collation key. In a preferred embodiment of the invention, the two pairs of gates per each memory trigger are reduced to three gates, one for the transmission of the spacing elements irrespectively of whether said elements are transmitted or collated elements and the two other for the transmission of the marking elements according to whether said elements are transmitted or collated.

Figure 1C:
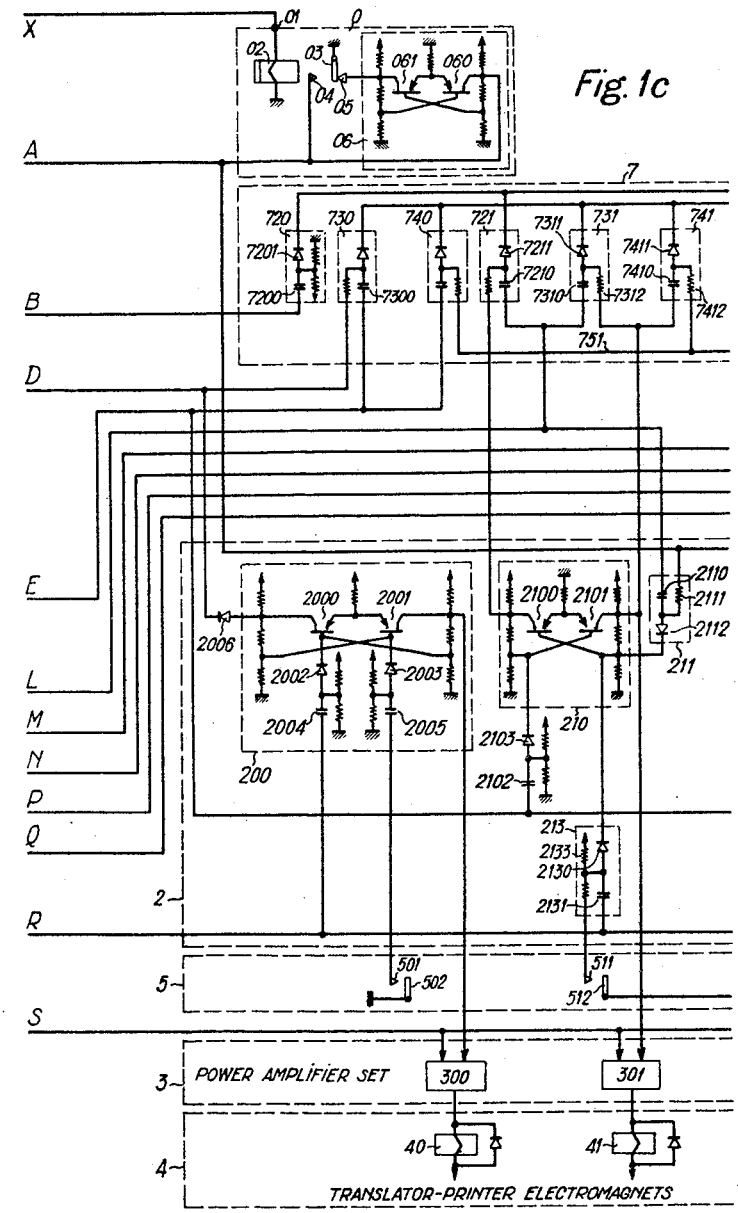
Figure 1D:
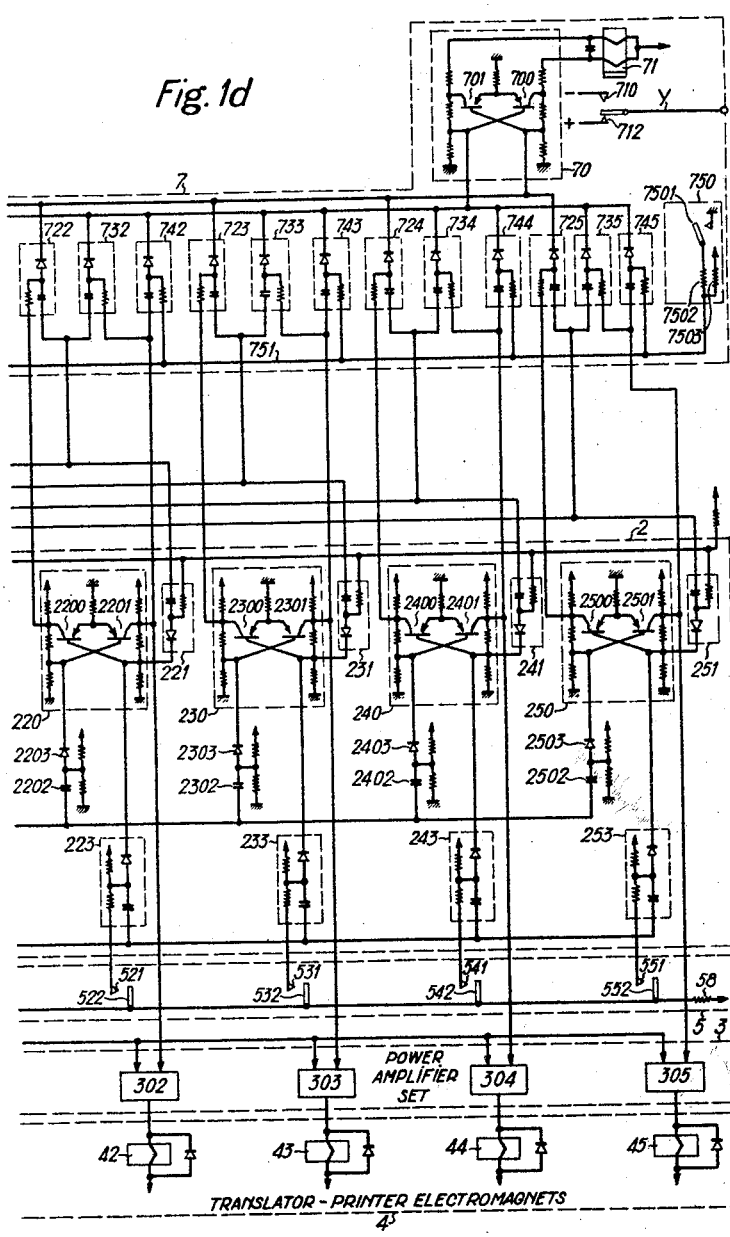
Figure 2:
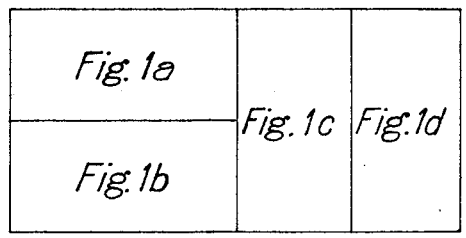

Further objects and advantages of the invention will be apparent from the following description, the appended claims and the drawings in which:

FIGS. 1a, 1b, 1c and 1d show the teleprinter of the invention partially in schematic diagrammatic form, partially in block diagrammatic form, FIG. 2 is a sketch showing how to assemble FIGS. 1a to 1d, FIGS. 3 and 4 show the wave-form and the time relations among various signals generated by the apparatus disclosed in FIGS. 1a to 1d, and FIGS. 5 and 6 are diagrams illustrating the principles of the retransmission or collation of a code-element.

The teleprinter comprises the following units:

A—reception device 0,
B—time-base 1,
C—memory device 2,
D—translator-printer 4,
E—control device of the translator-printer 3,
F—manual transmission keyboard 5,
G—transmission modulator 7.

Only units 1, 2, 7 which are new will be described in detail. Units 0, 3, 4, 5 are known in the prior art and are described in U.S. Patent 2,897,258.

Before describing in detail the different units of the teleprinter, the principle of the collation operation is explained with reference to FIGS. 5 and 6.

Figure 5:
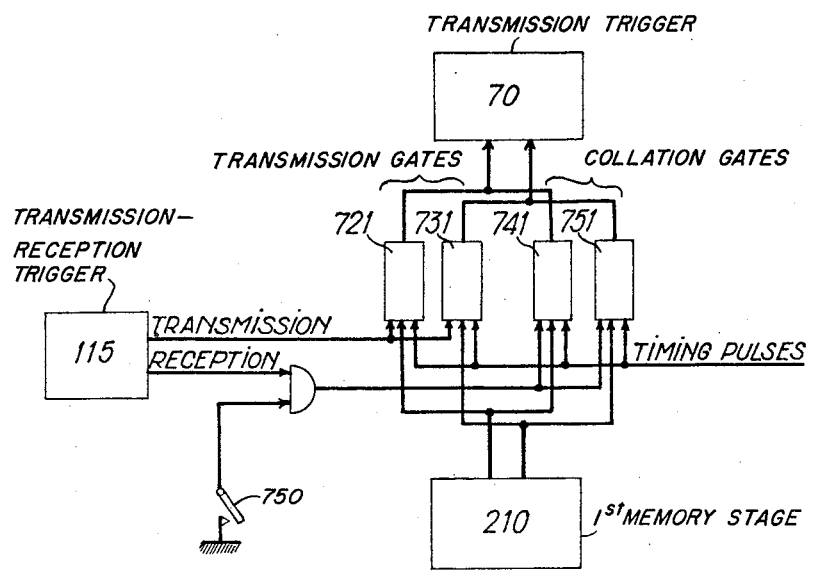

Referring first to FIG. 5, there are shown a trigger 210 of the memory device 2, the transmission trigger 70 and four "AND" gates forming two pairs 721—731 and 741—751. These two pairs connect the two outputs of trigger 210 to the two inputs of trigger 70. Gates 721—731 are controlled by timing pulses produced by a time-base and by the transmission output of a "transmission-reception" trigger 115. Gates 741—751 are controlled by the same timing pulses, by the reception output of the "transmission-reception" trigger and by a collation key 750.

FIG. 6 shows how to dispense with gate 751.

The principal parts of the teleprinter: reception trigger 0, time-base 1, memory device 2, transmission trigger 70 associated with telegraphic relay 71 and transmission modulator 7 are represented in block diagrammatic form in FIG. 6. For each gate there are shown two input connections, one drawn in thin line through which is applied to the gate a rather long pulse or code element, for instance twenty milliseconds long, and the other drawn in thick line through which is applied thereto a short control pulse having a duration of at most some microseconds. It will be seen below that the short pulse opens the gate and allows the transmission therethrough of the potential or the polarity of the code element.

Memory device 2 comprises at least five triggers 210, 220, 230, 240 and 250 for the storage of the code elements which are associated with four groups of "AND" gates.

These triggers are restored to rest by a pulse occurring at the instant 10 milliseconds and applied through lead E.

The gates of the first group, respectively 211, 221, 231, 241 and 251, operate during standard reception and during reception with collation. They are inserted between reception trigger 0 and the corresponding memory trigger and are respectively open, during a short interval, by pulses occurring at 30, 50, 70, 90, 110, milliseconds of the reception cycle and applied to said gates through leads, L, M, N, P, Q. Thus the code elements of the modulation received through the reception channel are serially stored in the triggers of the memory device.

The gates of the second group, respectively 721–725, and the gates of the third group, respectively 731–735, operate during transmission, standard reception and reception with collation. A gate of the second group, say gate 721, and a gate of the third group, say gate 731, are inserted between the two output terminals of the memory triggers, say trigger 210, and the two input terminals of the transmission trigger 70 and are open, during a short interval, by pulses occurring at 30, 50, 70, 90, 110 milliseconds and applied to said gates through leads L, M, N, P, Q. Thus, during transmission, the code elements of the modulation to be transmitted, parallelly stored in the memory device, are serially transferred to the transmission trigger. During standard reception and reception with collation, the gates open at the above mentioned instants but, since at these instants (30 milliseconds for example) the corresponding memory triggers (trigger 210) are still at rest because the access gates (gate 211) to said triggers are just opening and the corresponding code elements (first code element) are not yet transferred, the polarity transmitted through the gates of the second and third groups, during reception, is always a rest polarity that is a spacing polarity, and no element is sent through the transmission channel.

The gates of the fourth group, respectively 741–745 operates only during reception with collation. The gates of the fourth group, say gate 741, are inserted between one output terminal of the memory triggers, say trigger 210, and one input terminal of the transmission trigger 70 and are open, during a short interval, by changes in the state of the memory trigger. During reception with collation, a marking polarity is applied by means of a switch "With Collation-Without Collation" to the gates of the fourth group and said polarity is transferred to the transmission trigger through one of said gates if the associated memory trigger is brought from state "zero" to state "one" by a marking code element received through the reception channel. Said marking element is therefore immediately retransmitted through the transmission channel.

It must be well understood that the gates of the first group on the one hand and the gates of the second and third groups on the other hand are controlled by the same timing pulses irrespectively of whether the cycle to be considered is a transmission cycle, a reception without collation cycle or a reception with collation cycle. The gates of the second and third groups are inoperative during reception without collation since they only allow a spacing potential to pass. The gates of the fourth group are operative only during reception with collation since they are open, not by the timing pulses, but by the changes in the memory triggers.

A. RECEPTION DEVICE

The reception device shown in FIG. 1 constitutes unit 0 and includes: an input terminal 01 connected to a telegraphic reception channel X, a telegraphic relay 02 associated with a bistable trigger 06 comprising two transistors 060 and 061. Relay 02 establishes either contact 05 if a spacing element is applied to terminal 01, or contact 04 if a marking element is applied to this same terminal. Contacts 04 and 05 being respectively connected to the collectors of transistors 060 and 061 of trigger 06, trigger 06 is positioned according to the state of the reception channel. Transistor 061 is conductive and transistor 060 is blocked when the reception channel receives a spacing element. The collector of transistor 061 is then at a voltage somewhere near zero. If, on the contrary, the channel receives a marking element, this same collector is brought to a negative voltage. Line 0 of FIG. 3 represents the voltage changes of the collector of transistor 061 during two reception cycles.

When the reception device receives a start element, a ground voltage is applied to lead A and it will be seen that this voltage has the effect of starting time-base 1.

B. TIME BASE

The time-base shown in FIG. 2 constitutes unit 1 and is made up of:

A sine oscillator 100 oscillating at 100 c./s. for a telegraphic rate of 50 bauds;
A blocker 101;
A gate 102 for starting, keeping in the free running state and stopping the time-base;
A clipping circuit 103;
A false start elimination circuit 104;
Four binary demultipliers made up of triggers 111 to 114 associated with several gates;
A bistable trigger 115, called "transmission-reception" trigger, which is in the "zero" state (transistor 1150 conductive) when the teleprinter receives and in the "one" state (transistor 1150 blocked) when the teleprinter transmits;
Six gates 120 to 125 producing timing signals;
A gate 150 producing the positioning signal of memory device 2 during the transmission cycles;
Three gates 160 to 162 for controlling the control device of translator-printer 3.

(1) *Reception*.—As has already been shown in Chapter A, the reception of a start element at terminal 01 causes a ground potential to appear at the collector of transistor 060 of reception device 0. Through lead A and diodes 1024 and 1027 (FIG. 1a) this voltage is applied to the base of transistor 1010 which becomes nonconducting. Hence, the oscillating circuit made up of capacitor 1001 and inductor 1002, which, in the rest condition, was short-circuited through conducting transistor 1010, is no longer short-circuited and oscillator 100 begins to oscillate, applying to the base of transistor 1031 a sine voltage at a frequency of 100 c./s. shown by line 1 of FIG. 3. This signal is amplified by clipping circuit 103 which comprises amplifying transistors 1031, 1032, 1033. The collector of the latter then begins to produce a periodic rectangular voltage shown by line 2 of FIG. 3.

(a) Elimination of False Starts (A1) THE START ELEMENT LASTS LESS THAN 5 MILLISECONDS If the start element appearing at terminal 01 which had released oscillator 100, lasts less than 5 milliseconds, i.e. less than a half-cycle of the signal shown in FIG. 3, line 2, it ends before the blocking of transistor 1033 (point x of FIG. 3). Diodes 1024 and 1027 are then blocked and transistor 1010, being conducting again, blocks oscillator 100 by short-circuiting its tank circuit. Transistor 1033 is thus confirmed in its initial conducting state, i.e. its collector remains at zero voltage which it retains as long as the time-base is at rest; no signal is applied to binary demultiplier 111 which also remains in its initial state and the reception cycle is not started.

(A2) THE START ELEMENT LASTS AT LEAST 5 MILLISECONDS AND LESS THAN 10 MILLISECONDS

If the start element has not disappeared at terminal 01, at the instant of 5 milliseconds following its beginning, transistor 1033 is blocked and its collector becomes negative. In order to avoid that its return to the conducting state (point z of the signal in FIG. 3, line 2), while the start element has disappeared at terminal 01, should cause, under the effect of positive step u issued from its collector and transmitted by diode 1112, a change of state in the binary demultiplier 111 which would trigger off a complete reception cycle as will be seen later, a false start elimination circuit 104 maintains the first binary demultiplier 111 in its original state as soon as gate 102 is closed. The blocking of diode 1024, resulting from the disappearance of the start element at reception terminal 01, causes at the same time the blocking of both diodes 1027 and 1028. Therefore, the voltage drop across resistance 1043, resulting from the production of an inverse current through the Zener diode 1041 and resistor 1042 towards the feed current source, releases transistor 1040 which shortcircuits transistor 1110 and makes the blocking of the latter impossible by means of a positive pulse coming from clipping circuit 103 and applied to its base, whereby binary demultiplier 111 becomes insensitive to an eventual signal coming from the collector of transistor 1033. If the length of the start signal is less than 10 milliseconds, the reception cycle is therefore not initiated.

(A3) THE START ELEMENT LASTS AT LEAST 10 MILLISECONDS

If the start element has not disappeared after 10 milliseconds, diode 1028 remains conductive and transistor 1040 becomes non-conducting, thus eliminating the shortcircuit of transistor 1110. The positive step ($u$, FIG. 3) delivered at the instant 10 milliseconds by the collector of transistor 1033 and transmitted through diode 1112 causes the change of state of demultiplier 111 constituted by transistors 1110 and 1111 associated with gates 1113, 1114 and 1115. The collector of transistor 1111 then produces a positive step ($v$. FIG. 3) which, when applied through diode 1020 to gate 102, maintains oscillator 100 in the free-running state. When the start element stops, diode 1024 is blocked, as has already been shown, but diodes 1027 and 1028 remain unblocked through diode 1020. Thus the binary demultipliers (in this case binary demultiplier 111) maintain the oscillator in operation after it has started under the control of the start element.

Transistor 1033 then continues to produce rectangular signals having a period of 10 milliseconds, shown at line 2 of FIG. 3 and according to the known process, each positive front $u$, $u'$, $u''$ . . . applied to demultiplier 111 causes the change of state of transistors 1110 and 1111 constituting said trigger. The collector of transistor 1111 then produces the signal shown in FIG. 3, line 3. Through diode 1122, this signal is applied to binary demultiplier 112. The collector of transistor 1121 then produces the signal shown in FIG. 3, line 4, and this signal through diode 1132, is applied to binary demultiplier 113. The collector of transistor 1131 then produces the signal shown at FIG. 3, line 5. This last signal, through diode 1142, is applied to binary demultiplier 114, which causes the collector of transistor 1141 to generate the signal shown at FIG. 3, line 6.

In addition, the change of state of binary demultipliers 112, 113, 114 causes the release of diodes 1021, 1022, 1023 which all maintain diodes 1027 and 1028 unblocked, which allows oscillator 100 to continue to oscillate and the reception cycle to be completed, as has already been said.

At the end of this cycle, the four binary demultipliers 111, 112, 113, 114 are back at their initial state. Because of this, diodes 1020, 1021, 1022, 1023 are again blocked, which results in the blocking of diodes 1027, 1028 and then in the blocking of the oscillator. FIG. 3, line 13 shows the output signal of gate 102, the hatched portion corresponding to that part of the signal which is controlled by diode 1024, i.e. by the state of the reception channel.

(b) *Duration of Reception Cycle*

The counter constituted by the four demultipliers having a capacity of $2^4=16$ digits, and the oscillator period being 10 milliseconds, the duration of a complete cycle would be, if no special precaution were taken, 160 milliseconds. The duration of a reception cycle being that of 6.5 elements that is 130 milliseconds in the case of a telegraphic rate of 50 bauds, it is necessary to reduce the cycle duration of the counter. For that purpose, a correction signal is picked-up from the collector of transistor 1141 which produces a positive front at the instant 130 milliseconds, as shown in line 6 of FIG. 3.

This signal is transmitted through diode 1047 and connection lead B thence by gates 1115 and 1129, and is finally applied to the bases of transistors 1111 and 1121 which thus change their state respectively at $s$ and $t$ (FIG. 3, lines 3 and 4), a few tens of microseconds after the instant 130 milliseconds. The binary counter formed by demultipliers 111, 112, 113, 114 is thus brought back to its initial state after a cycle of 130 milliseconds.

It should be noted that the correction signal which is systematically applied to binary demultiplier 111, is applied to demultiplier 112, under the control of gate 1129, which is in its turn under the control of "transmission-reception" trigger 115 by means of connection lead 1154. During the reception cycles, transistor 1150 is conductive and the potential of its collector is near zero. Therefore, diode 1128 of gate 1129 is unblocked and transmits the timing pulse which comes from capacitor 1127 towards the base of transistor 1121.

(c) *Reset Signal*

The object of the reset signal is to position memory device 2 in the state corresponding to the combination "Letters" (the five code elements of which are spacing elements), or in other words to reset the memory device. It is obtained from the collectors of transistors 1130 and 1140 through diodes 1200, 1201 which form gate 120 which produces a positive step $e$ through connection lead E, at the instant 10 milliseconds as shown in line 7 of FIG. 3.

(d) *Testing Signals*

The testing signals are five in number. The object of each of them is to position a particular trigger of memory device 2 according to the state of the reception channel at the instant where it occurs. These testing signals are produced by the five gates 121–125.

The first testing signal $l$ is obtained from the collectors of transistors 1140, 1131, 1120 through diodes 1210, 1211, 1212 of gate 121 which produces through connection lead L, a positive step at the instant 30 milliseconds of the cycle as indicated by line 8 of FIG. 3.

The second testing signal $m$ is obtained from the collectors of transistors 1140 and 1131 through diodes 1220, 1221 of gate 122 which produces, through connection lead M, a positive step at the instant 50 milliseconds of the cycle as indicated by FIG. 3, line 9.

The third testing signal $n$ is obtained from the collectors of transistors 1141, 1130, 1120 through diodes 1230, 1231, 1232 of gate 123 which produces through connection lead N, a positive step at the instant 70 milliseconds of the cycle as indicated by line 10 of FIG. 3.

The fourth testing signal $p$ is obtained from the collectors of transistors 1141, 1130 through diodes 1240, 1241 of gate 124 which produces through connection lead P, a positive step at the instant 90 milliseconds of the cycle, as indicated by line 11 of FIG. 3.

The fifth testing signal $q$ is obtained from the collectors of transistors 1141, 1131, 1120 through diodes 1250, 1251, 1252 of gate 125 which produces through connection lead Q, a positive step at the instant 110 milliseconds of the cycle as indicated by line 12 of FIG. 3.

(e) *Control Signal of Translator-Printer*

The object of this signal $q$ is to transfer in the translator-printer the five code elements provisionably stored in the memory device and to initiate the printing cycle. It is produced at the instant 110 milliseconds by gate 160 controlled by "transmission-reception" trigger 115 and by gate 125 which produces a testing signal at the instant 110 milliseconds.

(2) *Transmission.*—The depression of a key of the keyboard causes connection lead D to be grounded. The ground potential on D, on the one hand, changes the state of the "transmission-reception" trigger 115 (transistor 1150 blocks and the voltage of its collector becomes negative) and, on the other hand, brings in the conductive state diodes 1025, 1027 and 1028. Transistor 1010 is thus blocked and oscillator 100 begins to oscillate as has already been explained in Chapter B, paragraph 1, in the case of reception. FIG. 4 shows the signals observed at different points of the time-base, namely the base of transistor 1031 (line 1), the collector of transistor 1033 (line 2), the collector of transistor 111 (line 3), the collector of transistor 1121 (line 4), the collector of transistor 1131 (line 5), the collector of transistor 1141 (line 6), the output of gate 120 (line 7), the output of gate 121 (line 8), the output of gate 122 (line 9), the output of gate 123 (line 10), the output of gate 124 (line 11), the output of gate 125 (line 12), and the base of transistor 1010 (line 13).

(a) *Duration of the Transmission Cycle*

The duration of the transmission cycle being that of 7.5 elements, i.e. 150 milliseconds in the case of a telegraphic rate of 50 bauds, the correction signal issued from the collector of transistor 1141 must cause a change of state in demultiplier 111 but not in demultiplier 112, as in the reception cycle. The correction signal is transmitted to demultiplier 111 through gate 1115 whilst gate 1129, which is blocked by the negative potential of the collector of transistor 1150, prevents it to be applied to demultiplier 112.

(b) *Reset Signal*

The object of this signal is to reset memory device 2 at the instant 10 milliseconds. It is produced by gate 120 in the same way as during reception. It is shown at *e* in line 7 of FIG. 4.

(c) *Memory Device Positioning Signal*

The object of the signal *r* for the positioning of the memory device is to transfer, within memory device 2, the five code elements produced by keyboard 5. This signal is a positive step produced at the instant 20 milliseconds and applied to connection lead R through gate 150 constituted by diodes 1500 to 1504 respectively connected to the collectors of transistors 1150, 1140, 1131, 1120, 1110. The signal issued from gate 150 is shown at *r* in line 14, FIG. 4.

(d) *Element Beginning Signals*

The element beginning signals have for their object to determine the characteristic instants of the modulation to be transmitted. They are seven in number and comprises:

A signal *e* for initiating the start element;
Five signals *l, m, n, p, q* for initiating the code elements;
A signal *b* for initiating the stop element.

The start element beginning signal is produced by gate 120. It occurs at 10 milliseconds on connection lead E and is represented at *e* in line 7 of FIG. 4.

The code element beginning signals are respectively produced by gates 121–125. They occur at 30, 50, 70, 90, 110 milliseconds respectively on connection leads L, M, N, P, Q and are respectively represented at *l* in line 8, *m* in line 9, *n* in line 10, *p* in line 11 and *q* in line 12 of FIG. 4.

The stop element beginning signal is picked-up from the collector of transistor 1141. It occurs at 130 milliseconds on connection lead B and is represented at *b* in line 6 of FIG. 4.

(e) *Control Signal of the Translator-Printer*

This signal *l* plays the same part as the similar signal *q* during the reception cycle but it occurs at 30 milliseconds through "AND" gate 161 which is controlled by "transmission-reception" trigger 115 and gate 121 which produces a signal at 30 milliseconds. Both gates 160 and 161 are connected to lead S of control of the power amplifier set by the "OR" gate 162.

C. MEMORY DEVICE

The memory device represented in FIGS. 1c and 1d constitutes unit 2 and comprises:

A trigger 200 controlled by the trip bar of the teleprinter;
Five memory triggers 210, 220, 230, 240, 250;
Five gates of access to the memory device from the reception trigger 211, 221, 231, 241, 251;
Five gates of access to the memory device from the code bars of the teleprinter 213, 223, 233, 243, 253.

Two ways of operation are to be considered depending on whether the memory device is operating on reception or transmission.

(1) *Reception.*—The reception of a start element at terminal 01 starts a reception cycle, as has been explained in Chapters A and B. At the instant 10 milliseconds of the reception cycle, memory triggers 210, 220, 230, 240, 250 are reset. This reset is obtained from signal *e* on connection lead E which is applied to differentiating capacitors 2102, 2202, 2302, 2402, 2502. Five pulses are obtained and transmitted respectively by diodes 2103, 2203, 2303, 2403, 2503 to the bases of transistors 2101, 2201, 2301, 2401, 2501 which become non-conducting whilst transistors 2100, 2200, 2300, 2400, 2500 become conductive.

At the instant 30 milliseconds of the reception cycle, the test signal *l* is applied through connection lead L to capacitor 2110 which differentiates it, and this gives rise to a positive pulse. Capacitor 2110 is part of gate 211 which comprises also both resistor 2111 and diode 2112. Two cases must now be considered:

If the element received at terminal 01 is a spacing element, armature 03 is in connection with stationary contact 05 and the collector of the transistor 060 is at a negative potential. This potential is transmitted through resistor 2111 to diode 2112 which is blocked, and this prevents the transmission through said diode of the positive pulse issued from capacitor 2110. Trigger 210 remains in its rest condition.

If, on the contrary, the element applied to terminal 01 is a marking element, armature 03 is in connection with stationary contact 04 which is thus brought to ground potential. This potential is transmitted through resistor 2111 to diode 2112 which becomes unblocked. The positive pulse issued from capacitor 2110 then passes through diode 2112 and blocks transistor 2100 which brings trigger to 210 into the state "one." Thus trigger 210 materializes the state of terminal 01 at the instant 30 milliseconds i.e. at the middle of the first code element.

The same operation occurs at the instant 50, 70, 90, 110 milliseconds of the reception cycle, from testing signals *m, n, p, q*, issued from connection leads M, N, P, Q and applied respectively to gates 221, 231, 241, 251 which transmit them or not according to the polarity of the element applied to terminal 01 and cause or not a change of state in triggers 220, 230, 240, 250.

From the instant 110 milliseconds of the cycle, the five triggers 210, 220, 230, 240, 250 are positioned and materialize the code elements which have been serially applied to terminal 01. The five triggers will remain in that state until the instant 10 milliseconds of the following cycle when they are brought back to their initial state by the reset signal *e*.

(2) *Transmission by the keyboard.*—The operation of a key of the keyboard involves:

(*a*) A beat of armature 502 controlled by the trip-bar of the teleprinter, which leaves the rest contact 500, establishes the work contact 501 and then reverts to its initial state.

(b) The positioning of armatures 512, 522, 532, 542, 552 controlled by the code bars of the teleprinter which either establish or do not establish a connection with contacts 511, 521, 531, 541, 551 according to whether the code element is a marking or a spacing element. It should be noted that the positioning of armatures 512, 522, 532, 542, 552 remains unchanged until the operator operates another key of the keyboard.

The establishment of contact 501 causes the application of a ground potential to capacitor 2005. The latter then produces a positive pulse which, transmitted through diode 2003, is applied to the base of transistor 2001 which becomes non-conducting. Trigger 200 is thus brought in the state "one." Transistor 2000 becomes conducting and the potential of its collector gets near to ground potential. This potential is transmitted through diode 2006 and connection lead D and is applied, on the one hand, to the collector of transistor 1151, which brings "transmission-reception" trigger 115 into the "transmission" state and, on the other hand, it is applied to diode 1025 which is unblocked, thus unblocking diodes 1027 and 1028 and, consequently, initiating oscillator 100 in accordance with the operation explained in Chapter B.

At the instant 10 milliseconds, the time-base produces the reset signal e on connection lead E, which has the effect of bringing triggers 210, 220, 230, 240, 250 of memory device 2 back to their initial state, in accordance with the operation explained in paragraph 1 of Chapter C.

At the instant 20 milliseconds, the time-base produces on connection lead R the signal r defined in paragraph 2c of Chapter B. The object of this signal is to insure:

(a) The transfer into the memory device of the code elements materialized by the code bars, (b) The reset of trigger 200, thus materializing the fact that the information set up in the keyboard has been transferred into the memory device.

Function a brings into action gates 213, 223, 233, 243, 253 respectively controlled by contacts 511, 521, 531, 541, 551. Each set formed by one gate and its associated contact corresponds to one of the five code elements. These five sets having quite identical operations, the operation of gate 213 in association with contact 511 will only be explained.

The positive step, which constitutes signal r for positioning the memory device, and which comes from gate 150 and is transmitted by lead R, is applied to capacitor 2131 which differentiates it. The positive pulse resulting from this differentiation is applied to diode 2130 which is connected to the base of transistor 2100.

Two cases must now be considered according to the polarity of the first code element to be transmitted.

If this first code element is a spacing element, contact 511 is off. Diode 2130 is blocked by a negative potential which is applied thereto through resistor 2133. The pulse which comes from capacitor 2131 is therefore blocked and cannot cause any change of state in trigger 210.

If, on the contrary, the first code element is a marking element, contact 511 is on and diode 2130 is unblocked by the action of resistors 2132 and 2133 which form a potential divider. From this, the pulse which comes from capacitor 2131 is transmitted through diode 2130 and is applied to the base of transistor 2100 which thus becomes blocked, causing trigger 210 to pass to state "one."

Simultaneously, the same operations take place in relation to the other four code elements. Consequently, the five code elements are simultaneously transferred into triggers 210, 220, 230, 240, 250, which remain in rest condition if the corresponding code element is a spacing element, or are brought into state "one" if the code element is a marking element. Finally, the memory device is positioned at the instant 20 milliseconds and will remain in this state until the instant 10 milliseconds of the following cycle.

Function b brings capacitor 2004 and diode 2002 into action. The application of the memory device positioning signal r to capacitor 2004 gives rise to a positive pulse which is transmitted through diode 2002 and is applied to the base of transistor 2000. This transistor becomes non-conducting, thus bringing back trigger 200 to its rest condition. Diode 2006 is blocked whilst the collector of transistor 2001 produces a release signal of a holding relay of the keyboard which is not represented. As the time-base continues the transmission cycle, the collector of transistor 1141 produces the signal b at the instant 130 milliseconds (FIG. 4, line 6). A voltage rise is transmitted through diode 1147 and is applied to capacitor 1152 which differentiates it. The positive pulse resulting from this differentiation is transmitted through diode 1153 and is applied to the base of transistor 1151. Two cases must then be considered:

(a) A new information has been introduced into the keyboard, (b) No new information has been introduced into the keyboard.

In Case a trigger 200 is again in state "one." The potential of the collector of transistor 2000 is near zero and diode 2006 is unblocked. Trigger 115 is now maintained in the "transmission" state and the pulse applied to the base of transistor 1151 is non-operative. As the "transmission-reception" trigger 115 remains in the "transmission state," oscillator 100 cannot be blocked and the time-base immediately initiates another transmission cycle in accordance with the procedure described earlier.

In Case b trigger 200 is reset. The potential of the collector of transistor 2000 is negative and diode 2006 is blocked. Therefore the pulse applied to the base of transistor 1151 causes a change in trigger 115 which reverts to its "reception" state. The potential of the collector of transistor 1151 being negative, diode 1025 is blocked and the time-base completes its actual cycle and is blocked at the instant 150 milliseconds.

D. TRANSLATOR-PRINTER

The electromagnet set of the translator-printer is of a conventional type disclosed in chapter H of U.S. Patent 2,897,258. It comprises five code electromagnet 41 to 45 intended to control the positioning of the translator-printer code bars and an initiating electromagnet 40 intended to initiate the translator-printer mechanical cycle.

E. POWER AMPLIFIER SET

The power supply amplifier set for the translator-printer is of known type disclosed in chapter G of U.S. Patent 2,897,258. It comprises an amplifier 300 for controlling electromagnet 40 and five amplifiers 301 to 305 combined with AND gates for the control of the code electromagnets 41 to 45. The amplifiers 300 to 305 are placed under the dual control of the corresponding trigger of the memory device 2, respectively 200, 210, 220, 230, 240, 250 and of the time-basis 1 which applies to connection lead S a signal occurring at 110 milliseconds during the reception cycles and at 30 milliseconds during the transmission cycles.

F. KEYBOARD

The keyboard is of a conventional type. It comprises keys, a trip bar and five code bars not represented and a general contact (501—502) controlled by the trip bar and five code contacts (511—512), (521—522), (531—532), (541—542), (551—552) controlled by the code bars. The mobile contacts 512, 522, 532, 542, 552 are connected to the negative terminal of the battery through resistor 58.

G. TRANSMISSION MODULATOR

The transmission modulator constitutes unit 7 of FIG. 1. It is intended, on the one hand, for transmitting the telegraphic signals which correspond to the code elements which are memorized in memory device 2 and for retransmitting the telegraphic signals which correspond to the code elements received through the reception channel.

The transmission modulator is essentially made up of transmission trigger 70 associated with telegraphic relay 71, groups of six gates 120 to 125, 130 to 135, 140 to 145, the first gates of each group corresponding to the start element and the five last gates corresponding to the code elements, and switch 750 which allows to choose during reception, either reception without collation or reception with collation.

(1) Transmission of a Telegraphic Character (a) *Transmission of the start element.*—At the instant 10 milliseconds which follows the initiation of the time-base through lead D, gate 120 produces the signal *e* (FIG. 4, line 7) which constitutes the beginning signal of the start element. This signal is transmitted through lead E and is applied to capacitor 7300 associated with a resistor which both differentiate it. The positive pulse produced by this differentiation is transmitted through diode 7301 if lead D is at ground potential (this is so in the case when trigger 115 is in the "transmission" state) and is applied to the base of transistor 700 and brings transmission trigger 70 into the marking condition. The change of condition of the transmission trigger 70 allows relay 71 to operate; said relay opens its contact 712 and closes its contact 710 which changes the positive spacing signal which was applied to transmission channel Y into a negative marking signal.

(b) *Transmission of the code elements.*—At the instant 30 milliseconds which follows the initiation of the time-base, gate 121 produces the signal *l* (FIG. 4, line 8) which constitutes the beginning signal of the first code element. This signal is transmitted through lead L and is applied to capacitors 7210 and 7310 which differentiate it, thus giving rise to two positive pulses which are applied respectively to diodes 7211 and 7311.

If the code element previously stored in memory trigger 210 is a marking element, the potential of the collector of transistor 2100 is negative whilst the potential of the collector of transistor 2101 is near zero. Accordingly, diode 7211 is blocked through resistor 7212 whilst diode 7311 is unblocked through resistor 7312. It results that the pulse coming from capacitor 7210 is blocked by diode 7211 whilst the pulse coming from capacitor 7310 is transmitted by diode 7311 towards the base of transistor 700. Transmission trigger 70 is therefore confirmed in its marking state and a marking element is transmitted through transmission channel Y.

If, on the contrary, the code element previously stored in memory trigger 210 is a spacing element, the potential of the collector of transistor 2101 is negative, whilst the potential of transistor 2100 is near zero. Accordingly, diode 7311 is blocked through resistor 7312 whilst diode 7211 is unblocked through resistor 7212. It results that the pulse coming from capacitor 7310 is blocked by diode 7311 whilst the pulse coming from capacitor 7210 is transmitted by diode 7211 towards the base of transistor 701 which is blocked. Transmission trigger 70 changes from the marking condition to the spacing condition and a spacing code element succeeds the marking start element.

To summarize, the code element beginning signal which is produced by gate 121 is routed by gates 721 and 731 and positions transmission trigger 70 according to the state of trigger 210 of the memory device, i.e. in accordance with the polarity of the first code element of the character to be transmitted.

In the same way, the code element beginning signals *m*, *n*, *p*, *q* produced by gates 122 to 125 are transmitted respectively by leads M, N, P, Q and routed by paired gates 722—732, 723—733, 724—734, 725—735 and they position transmission trigger 70 according to the state of triggers 220, 230, 240, 250 of the memory device, i.e. in accordance with the polarity of the 2nd, 3rd, 4th and 5th code elements of the character to be transmitted.

(c) *Transmission of the stop element.*—At the instant 130 milliseconds which follows the initiation of the time-base, the collector of transistor 1141 produces the signal *b* which determines the beginning of the stop element (FIG. 4, line 6). The positive step which constitutes this signal is transmitted through diode 1147 and lead B and is then applied to capacitor 7200 which differentiates it. The positive pulse resulting from this differentiation is transmitted through diode 7201 and is finally applied to the base of transistor 701 which becomes non-conducting, causing the positioning of transmission trigger 70 into the spacing state and therefore the transmission of a spacing signal through the transmission channel, which signal will continue until the initiation of a new transmission cycle.

Line 0 of FIG. 4 represents the signal produced by the collector of transistor 700 during a transmission cycle. It will be noted that the instant zero of the telegraphic transmission cycle is located 10 milliseconds after the freeing of the time-base and that this delay of 10 milliseconds in relation to the time origin continues throughout the telegraphic transmission cycle.

The collating gates (gates of the fourth group) 740–745 have a permanent ground potential applied thereto by means of switch 750 and they are eventually opened by pulses derived from the state changes of the memory triggers.

For operating collation, contact 7501 is closed and near to the ground potential, derived from the potential divider made up of resistors 7502 and 7503, is applied through lead 751, to gates 740–745; thus, a marking potential may be applied to transmission trigger 70 when one of the said gates, normally closed, will pass into the open condition.

The first code element of the telegraphic combination is received and stored at the instant 30 milliseconds in memory trigger 210.

If the element received is a marking element, trigger 210 will change its state when the step *l* coming from lead L is applied to the base of transistor 2100 at the instant 30 milliseconds. At that same instant, gates 721 and 731 also receive this step *l* which is applied to both capacitors 7210 and 7310. Gate 731 is closed by the negative potential picked-up from the collector of transistor 2101. Gate 721 is opened by the positive potential picked-up from the collector of transistor 2100, so that a pulse is passed through said gate towards trigger 70. This trigger has no time to react to this pulse for, as soon as gate 210 has changed its state, the positive potential produced by transistor 2101 is applied to capacitor 7410 of gate 741. This gate produces a pulse and allows it to pass towards gate 70 which reacts to this control for ensuring the transmission of marking element corresponding to the received marking element.

If the element received is a spacing element, gate 210 will remain in the "zero" state. At the instant 30 milliseconds gate 721, which is opened by the positive potential picked-up from the collector of transistor 2100 of trigger 210 which is now in the "zero" state, receives the signal *l* transmitted through lead L and allows a pulse to pass towards the base of transistor 700 of transmission trigger 70 which changes its state thus ensuring the transmission of a spacing element corresponding to the received spacing element.

The operation of these circuits for collating the other code elements is similar to that which has just been described for the first code element when considering instead of the instant 30 milliseconds, the instants 50, 70, 90 and 110 milliseconds.

The transmission of the step element of the telegraphic combination element takes place under the control of the positive step signal arriving at the instant 130 milliseconds through lead B. The pulse derived from said step signal resets transmission trigger 70 or confirms it in the "zero" state. In this state the mobile armature of relay 71 is against stationary contact 712 and a spacing potential is applied to the transmission channel.

Though the invention has been disclosed in the case of a telegraphic rate of 50 bauds, it can be used for any telegraphic rate. For a rate of 45.5 bauds for example, the oscillator 100 would have a frequency of 91 c./s. instead of 100 c./s.

What we claim is:

1. An electronic teleprinter adapted to collate through a transmission channel start and code elements received through a reception channel comprising a memory device constituted by at least as many memory triggers as code elements, a reception trigger, a transmission trigger, a time-basis adapted to produce a single series of timing pulses, a transmission-reception trigger having a transmission output and a reception output, a keyboard, a translator-printer, a collation key, a first set of gates inserted between the reception trigger and the memory triggers, controlled both by the time-basis and by the reception output of the transmission-reception trigger and allowing, during reception, the code elements of a received telegraphic character to be serially transferred from the reception trigger to the memory device, a second set of gates inserted between the memory triggers and the translator-printer and controlled by the time-basis, a third set of gates inserted between the keyboard and the memory triggers and controlled by the time-basis and a fourth set of gates inserted between the memory triggers and the transmission trigger, said fourth set of gates comprising two groups of pairs of gates, the pairs of gates of the first group being controlled both by the time-basis and by the transmission output of the transmission-reception trigger and allowing, during transmission, the code elements of a telegraphic character to be transmitted to be serially transferred from the memory device to the transmission trigger and the pairs of gates of the second group being controlled at the same time by the time-basis, by the reception output of the transmission-reception trigger and by the collation key and allowing, during reception with collation, the code elements of a received telegraphic character to be collated to be serially transferred from the memory device to the transmission trigger.

2. An electronic teleprinter adapted to collate through a transmission channel and code elements received through a reception channel comprising a memory device constituted by at least as many memory triggers as code elements, each of said memory triggers having a marking and a spacing output terminal, a reception trigger, a transmission trigger having a marking and a spacing input terminal, a time-basis adapted to produce a single series of timing pulses, a transmission-reception trigger having a transmission output and a reception output, a keyboard, a translator-printer, a collation key, a first set of gates inserted between the reception trigger and the memory triggers, controlled both by the time-basis and by the reception output of the transmission-reception trigger and allowing, during reception, the code elements of a received telegraphic character to be serially transferred from the reception trigger to the memory device, a second set of gates inserted between the memory triggers and the translator-printer and controlled by the time-basis, a third set of gates inserted between the keyboard and the memory triggers and controlled by the time-basis and a fourth set of gates inserted between the memory triggers and the transmission trigger, said fourth set of gates comprising two groups of gates, the first group being composed of pairs of gates connecting the marking and spacing output terminals of the memory triggers to the marking and spacing input terminals of the transmission trigger, controlled by the time-basis and allowing, during transmission, the code elements of a telegraphic character to be transmitted to be serially transferred from the memory device to the transmission trigger and the second group being composed of single gates connecting the marking output terminal of each of the memory triggers to the marking input terminal of the transmission trigger, controlled both by the collation key and by changes of state of the memory triggers.

References Cited in the file of this patent

UNITED STATES PATENTS 2,985,714   Barbeau et al.   May 23, 1961
2,989,729   Schafer   June 20, 1961